United States Patent
Wilm

(10) Patent No.: US 10,066,663 B2
(45) Date of Patent: Sep. 4, 2018

(54) TAPERED ROLLER BEARING, METHOD FOR PRODUCING THE TAPERED ROLLER BEARING AND METHOD FOR SECURELY MOUNTING THE TAPERED ROLLER BEARING

(71) Applicant: Schaeffler Technologies AG & Co. KG, Herzogenaurach (DE)

(72) Inventor: Bernhard Wilm, Nudlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/129,217

(22) PCT Filed: Jan. 29, 2015

(86) PCT No.: PCT/DE2015/200041
§ 371 (c)(1),
(2) Date: Sep. 26, 2016

(87) PCT Pub. No.: WO2015/154758
PCT Pub. Date: Oct. 15, 2015

(65) Prior Publication Data
US 2017/0122367 A1    May 4, 2017

(30) Foreign Application Priority Data

Apr. 7, 2014 (DE) .................. 10 2014 206 661

(51) Int. Cl.
*F16C 19/36* (2006.01)
*F16C 33/46* (2006.01)
*F16C 43/04* (2006.01)

(52) U.S. Cl.
CPC ........ *F16C 19/364* (2013.01); *F16C 33/4605* (2013.01); *F16C 43/04* (2013.01)

(58) Field of Classification Search
CPC ............... F16C 19/364; F16C 33/4605; F16C 33/7889; F16C 43/04; F16C 43/045
See application file for complete search history.

(56) References Cited

U.S. PATENT DOCUMENTS

| | | | |
|---|---|---|---|
| 2,195,795 A | 4/1940 | Baker | |
| 2,435,839 A | 2/1948 | McNicoll | |
| 3,006,701 A * | 10/1961 | Curtis | ................... F16C 19/364 384/484 |
| 3,858,950 A * | 1/1975 | Otto | ...................... F16C 19/364 277/353 |

(Continued)

FOREIGN PATENT DOCUMENTS

| | | |
|---|---|---|
| DE | 2442767 | 3/1976 |
| DE | 3841629 | 6/1990 |

(Continued)

OTHER PUBLICATIONS

Translation of DE102009054020 obtained Oct. 19, 2017.*
Translation of DE102010014453 obtained Oct. 19, 2017.*

*Primary Examiner* — James Pilkington
(74) *Attorney, Agent, or Firm* — Volpe & Koenig, P.C.

(57) ABSTRACT

A tapered roller bearing is disclosed having a support for pressing roller bodies and a holder for holding an outer ring. A method for producing the tapered roller bearing and a method for mounting a tapered roller bearing are also disclosed.

10 Claims, 1 Drawing Sheet

(56) References Cited

U.S. PATENT DOCUMENTS

| | | | |
|---|---|---|---|
| 4,900,166 A * | 2/1990 | Candiard | B60B 27/001 384/560 |
| 5,009,525 A | 4/1991 | Brockmuller et al. | |
| 8,356,946 B2 | 1/2013 | Schaefer et al. | |
| 8,783,966 B2 * | 7/2014 | Schlegel | F16C 33/4605 384/448 |
| 2013/0077905 A1 * | 3/2013 | Shimizu | F16C 33/7813 384/445 |
| 2015/0043858 A1 | 2/2015 | Aust et al. | |
| 2015/0071581 A1 | 3/2015 | Gieser | |

FOREIGN PATENT DOCUMENTS

| | | | |
|---|---|---|---|
| DE | 102006017162 | | 10/2007 |
| DE | 102010014453 | * | 6/2010 |
| DE | 102009054020 | | 5/2011 |
| DE | 102009055754 | | 6/2011 |
| DE | 102011006289 | | 10/2012 |
| DE | 102012206659 | | 10/2013 |
| FR | 2925944 | | 7/2009 |

* cited by examiner

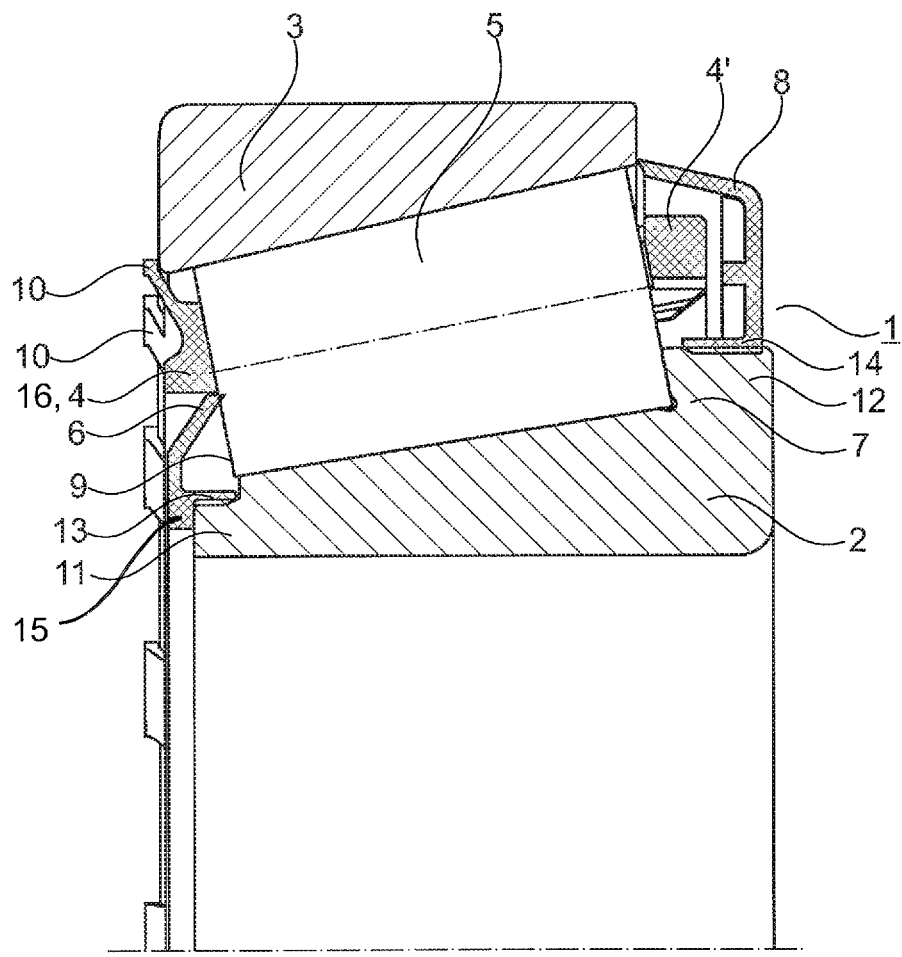

TAPERED ROLLER BEARING, METHOD FOR PRODUCING THE TAPERED ROLLER BEARING AND METHOD FOR SECURELY MOUNTING THE TAPERED ROLLER BEARING

FIELD OF THE INVENTION

The invention relates to a tapered roller bearing, a method for producing the tapered roller bearing, and a method for securely mounting the tapered roller bearing.

BACKGROUND

A plurality of tapered roller bearings is known from the prior art.

In the tapered roller bearings known from the prior art, the outer ring is mounted separate from the roller set. Here, the inner ring with the roller set is pressed onto a stub shaft. During the mounting, the roller set must be greased in the workshop.

A disadvantage in the prior art is that contaminating particles enter into the bearing interior, unsuitable greases are used, and a wheel hub has to be turned while tightening a central nut, so that the tapered rollers can be positioned on a supporting flange.

SUMMARY

The technical objective is therefore to develop a tapered roller bearing and a method for its production, in order to eliminate the disadvantages from the prior art.

The objective is achieved according to the invention, in particular, by a tapered roller bearing comprising an inner ring, an outer ring, and a roller bearing cage with a number of roller bodies, wherein the roller bodies are arranged so that they can rotate between the inner ring and the outer ring, characterized in that A supporting element is provided that are designed to press the roller bodies in the direction of a supporting flange of the inner ring, and The roller bearing cage has holding element for holding the outer ring.

By providing the supporting element and the holding element, the outer ring can be mounted together with the inner ring and the roller bodies. In this way, a secure mounting of the tapered roller bearing is possible without a wheel hub having to be turned during the tightening of a central nut.

By the use of the supporting element and the holding element, a positive-fit connection between the outer ring and the roller bodies with the inner ring can be achieved.

In one embodiment according to the invention, the supporting element has an essentially ring-shaped profile along a first area of the inner ring and has a section that is connected to the inner ring.

The supporting element is preferably constructed as a supporting lip. The supporting lip is preferably produced from a plastic.

In another embodiment according to the invention, a connection of the supporting element to the inner ring is constructed as a press-fit connection.

In this way, a simple and economical connection can be produced.

Preferably, the connection of the supporting element to the inner ring is a tight interference-fit connection.

In another embodiment according to the invention, the supporting element is designed to press onto each of the end sides of the roller bodies.

In this way, the tapered rollers can be positioned with a positive fit on the supporting flange of the inner ring.

The supporting element preferably has a protruding area, in particular, a supporting lip, for this purpose.

In this way, a compressive force can be easily generated along the end sides of the roller bodies.

In another embodiment according to the invention, the tapered roller bearing has a cover that is designed to cover a part of the roller bearing cage.

In this way, a simple possibility is provided for protecting the tapered roller bearing from contaminating particles, moisture, oils, liquids, and the like.

Preferably, the cover is constructed as a dust cap.

In another embodiment according to the invention, the cover has an essentially ring-shaped profile along a second area of the inner ring and has a section that is connected to the inner ring.

In this way, the tapered roller bearing can be sealed to the outside.

In another embodiment according to the invention, a connection of the cover to the inner ring is constructed as a tight interference-fit connection.

In this way, a simple and economical connection can be produced.

The connection of the cover to the inner ring is preferably a matching connection.

Furthermore, the objective is achieved according to the invention in particular by a method for producing a tapered roller bearing comprising the steps:

Attaching a roller bearing cage to a number of roller bodies on an inner ring, wherein the roller bearing cage has a holding element for holding the outer ring, Connecting a first area of the inner ring to a support ring, wherein the supporting element press the roller bodies in a direction of a supporting flange of the inner ring, and Placing of an outer ring on the roller bodies.

In this way, a positive-fit connection between the outer ring and the roller bearing can be achieved.

In another embodiment according to the invention, the method further has the steps:

Greasing the roller bodies, and

Connecting a cover to a second area of the inner ring.

In this way, greasing can take place during a joining of the components of the tapered roller bearing.

Furthermore, the objective is achieved according to the invention in particular by a method for mounting a tapered roller bearing having the step:

Mounting a tapered roller bearing in a wheel hub, and

Pushing the wheel hub bearing unit onto a stub shaft.

In this way it is possible to push the tapered roller bearing preferably by hand onto the stub shaft, without having to turn the wheel hub during the tightening of the central nut.

BRIEF DESCRIPTION OF THE DRAWING

The invention will now be illustrated by a FIGURE using an example; shown is:

FIG. 1 a schematic section through a tapered roller bearing according to the invention.

DETAILED DESCRIPTION OF THE PREFERRED EMBODIMENT

In FIG. 1, a schematic section through a tapered roller bearing according to the invention is shown.

The tapered roller bearing 1 has an inner ring 2, an outer ring 3, and a roller bearing cage 4 with a number of roller bodies, of which only one roller body 5 is shown. All of the roller bodies 5 are constructed as tapered rollers. These are arranged so that they can rotate between the inner ring 2 and the outer ring 3.

Furthermore, a supporting element 6 is provided. The supporting element 6 is designed to press the roller bodies 5 in the direction of a supporting flange 7 of the inner ring 2.

The roller bearing cage 4 also has holding element 10 for holding the outer ring 3. The holding element 10 extends from a portion 16 of the roller bearing cage positioned radially centrally to an end side 9 of the roller body 5 to engage an end side of the outer ring 3.

The supporting element 6 has essentially a ring-shaped profile along a first area 11 of the inner ring 2. The supporting element 6 has a section 13 that is connected to the first area 11 of the inner ring 2. A connection of the supporting element 6 to the inner ring 2 is constructed as an interference connection. As shown, a portion 15 of the supporting element 6 positioned outside an axial end of the inner ring 2.

Here, the supporting element 6 is constructed as a supporting lip.

The supporting element 6 presses on each of the end sides 9 of the roller bodies 5.

The tapered roller bearing 1 has a cover 8 that is designed to cover a part 4' of the roller bearing cage 4.

Here, the cover 8 has an essentially ring-shaped profile along a second area 12 of the inner ring 2. The cover 8 has a section 14 that is connected to the second area 12 of the inner ring 2. A connection of the cover 8 to the inner ring 2 is constructed as an interference connection.

The cover 8 is constructed as a dust cap.

For producing the tapered roller bearing 1, the following steps are performed:

First, the roller bearing cage 4 is mounted with the number of roller bodies 5 on the inner ring 2.

Then a first area 11 of the inner ring 2 is connected to the supporting element 6. Here, the supporting element 6 presses the roller bodies 5 in the direction of the supporting flange 7 of the inner ring 2.

The outer ring 3 is then placed on the roller bodies 5. This produces a positive-fit connection 13 between the outer ring 3 and the roller bodies 5.

The roller bodies 4 are finally greased. Then the cover 8 is connected to the inner ring 2.

With the tapered roller bearing according to the invention, by providing the supporting element and the holding element, the outer ring can be mounted together with the inner ring and the roller bodies. In this way, a secure mounting of the tapered roller bearing is possible without a wheel hub bearing unit having to be turned during the tightening of a central nut.

LIST OF REFERENCE NUMBERS

1 Tapered roller bearing
2 Bearing inner ring
3 Bearing outer ring
4 Roller bearing cage
4' Part of the roller bearing cage
5 Roller bodies
6 Supporting element (supporting ring)
7 Supporting flange
8 Cover (dust cap)
9 End side
10 Holding element (cage holding segment)
11 First area
12 Second area
13 Section of the supporting element
14 Section of the cover
15 Portion of the supporting element
16 Portion of the roller bearing cage

The invention claimed is:

1. A tapered roller bearing comprising an inner ring, an outer ring, and a roller bearing cage with a number of roller bodies, wherein the roller bodies are arranged so that they are rotatable between the inner ring and the outer ring,
   a supporting element that presses the roller bodies in a direction of a supporting flange of the inner ring, a portion of the supporting element positioned outside an axial end of the inner ring and a section of the supporting element is constructed as an interference fit connection with the inner ring, the section is positioned within a radial extent of the inner ring, the radial extent is measured from an inner diameter of the inner ring to an outer diameter of the inner ring, and
   the roller bearing cage has a holding element for holding the outer ring.

2. The tapered roller bearing according to claim 1, wherein the supporting element has a substantially ring-shaped profile along a first area of the inner ring.

3. The tapered roller bearing according to claim 1, wherein the roller bodies have end sides and the supporting element presses on each of the end sides of the roller bodies.

4. The tapered roller bearing according to claim 1, further comprising a cover that covers a part of the roller bearing cage.

5. The tapered roller bearing according to claim 4, wherein the cover has a substantially ring-shaped profile along a second area of the inner ring and a section that is connected to the inner ring.

6. The tapered roller bearing according to claim 5, wherein a connection of the cover to the inner ring is constructed as an interference fit connection.

7. The tapered roller bearing according to claim 1, wherein the holding element extends from a portion of the roller bearing cage positioned radially centrally to an end side of the roller body to engage an end side of the outer ring.

8. A method for producing a tapered roller bearing, comprising:
   attaching a roller bearing cage to a number of roller bodies on an inner ring, wherein the roller bearing cage has holding elements,
   connecting a first area of the inner ring to a support ring with an interference fit and positioning a portion of the support ring outside an axial end of the inner ring, wherein the support ring presses the roller bodies in a direction of a supporting flange of the inner ring, and wherein a section of the support ring is positioned within a radial extent of the inner ring to provide the interference fit, the radial extent is measured from an inner diameter of the inner ring to an outer diameter of the inner ring, and
   placing an outer ring on the roller bodies, wherein the holding elements are for holding the outer ring.

9. The method for producing a tapered roller bearing according to claim 8, further comprising:
   greasing the roller bodies, and
   connecting a cover to a second area of the inner ring.

10. A tapered roller bearing comprising an inner ring, an outer ring, and a roller bearing cage with a number of roller bodies, wherein the roller bodies are arranged so that they are rotatable between the inner ring and the outer ring,
a supporting element that presses the roller bodies in a direction of a supporting flange of the inner ring, and
the roller bearing cage has a holding element for holding the outer ring, wherein the holding element extends from a portion of the roller bearing cage positioned radially centrally to an end side of the roller body to engage an end side of the outer ring.

* * * * *